United States Patent [19]
Enger

[11] 3,976,865
[45] Aug. 24, 1976

[54] ERROR DETECTOR FOR AN ASSOCIATIVE DIRECTORY OR TRANSLATOR

[75] Inventor: Thomas Arthur Enger, Wappingers Falls, N.Y.

[73] Assignee: International Business Machines Corporation, Armonk, N.Y.

[22] Filed: Aug. 15, 1975

[21] Appl. No.: 604,970

[52] U.S. Cl.................. 235/153 AK; 235/153 AM; 340/146.1 BE
[51] Int. Cl.²................... G11C 29/00; H03K 13/34
[58] Field of Search............... 235/153 AC, 153 AK, 235/153 AM; 340/146.1 BE, 172.5, 173 AM, 174 ED

[56] References Cited
OTHER PUBLICATIONS
Sellers, F. F. et al. *Error Detection Logic for Digital Computers,* N.Y., McGraw-Hill, 1968, p. 122.

*Primary Examiner*—R. Stephen Dildine, Jr.
*Attorney, Agent, or Firm*—Robert W. Berray

[57] ABSTRACT

Error detection for an associative directory or translator, composed of registers, comparators, and encoder which provides a binary code representation of the location of the register at which a compare occurred, includes a random access register array which responds to the coded location information to read out binary data to be compared with the binary data utilized in the associative compare of the directory or translator.

5 Claims, 2 Drawing Figures

ERROR DETECTOR FOR AN ASSOCIATIVE DIRECTORY OR TRANSLATOR

BACKGROUND OF THE INVENTION

1. Field of The Invention

This invention relates to error detection apparatus and more particularly to apparatus utilized to check the proper functioning of an associative directory or translator.

2. Environment of Invention

Incorporated by reference herein is U.S. Pat. 3,248,702 entitled "Electronic Digital Computing Machines" by T. Kilburn et al and which is assigned to the assignee of the present invention. This patent discloses a storage hierarchy in which address translation is required to control the transfer of blocks of data from a slow, high-capacity drum store to a fast, low-capacity core memory. At any one time, the high speed core memory can store only 16 blocks of data, whereas the drum store can accommodate $2^9$ blocks of data. Sixteen associative compare registers, each associated with a particular one of the 16 blocks of core storage, retain the 9 address bits which identify the particular one of the $2^9$ blocks of data presently being stored in the associated block of core memory. As each request for data by a processor is made, the 9 high order address bits are utilized in a compare operation. This determines whether or not any of the associative registers contain the same address bits, indicating that the requested data is in the core memory. A compare identifies a particular one of the associative registers, the identity of the register being utilized by an encoder to generate 4 address bits utilized to address the particular one of the 16 blocks in the core memory containing the requested data.

When the nine high order address bits of requested data do not match with any address bits in the 16 associative compare registers, a technique must be provided for determining which of the 16 blocks of data in the core memory must be replaced with the requested data. Therefore, also incorporated by reference in this application is U.S. Pat. No. 3,217,298 entitled "Electronic Digital Computing Machines" by T. Kilburn et al and also assigned to the assignee of this application. This patent discloses a technique for determining the particular one of the 16 blocks of data in the core memory to be replaced by requested data not presently stored in the core memory.

SUMMARY OF INVENTION

In the above referred to patents, which include a number of registers, the contents of which are to be compared with a source of binary address bits to identify a particular one of the registers containing a match, the identity of which register is to be encoded into a different plurality of binary address bits, no apparatus is provided for checking the proper functioning of the compare mechanism, the array registers, or the encoder.

It is therefore a principle object of this invention to provide error detecting capability in apparatus utilizing an associative compare operation to perform translation from a first binary code to a second binary code.

This object is achieved by adding to the previously described mechanism, a second array of registers, each register of which is associated with a particular one of the associative compare registers. The identity of the associative compare register indicating a match with the address bits to be translated, is identified by the output of the encoder, which responds to the compare circuit indicating the match. The encoded information which is utilized to access the requested data from, for example, the core memory in the above-referenced patent application, is then utilized in address decoding apparatus associated with the second array of registers for reading out the register identified by the encoded address bits. A check is then performed by utilizing the output of the register of the second array in a compare operation with the original address bits which were translated. Proper functioning of the compare and encoder circuits will be indicated if the compare operation indicates a match.

When associative compare operation indicates the absence of a match, and the replacement technique determines the particular associative register to receive the new information, the new information is inserted in the selected associative register. A hit, or compare, will now be achieved, the encoder will identify the associative register receiving the new information, and the encoded output will be utilized to access the associated register in the second array to receive the same contents as inserted in the associative compare register. Subsequent compares and encoding can then be checked utilizing the register of the second array.

DETAILED DESCRIPTION OF INVENTION

Figure 1:
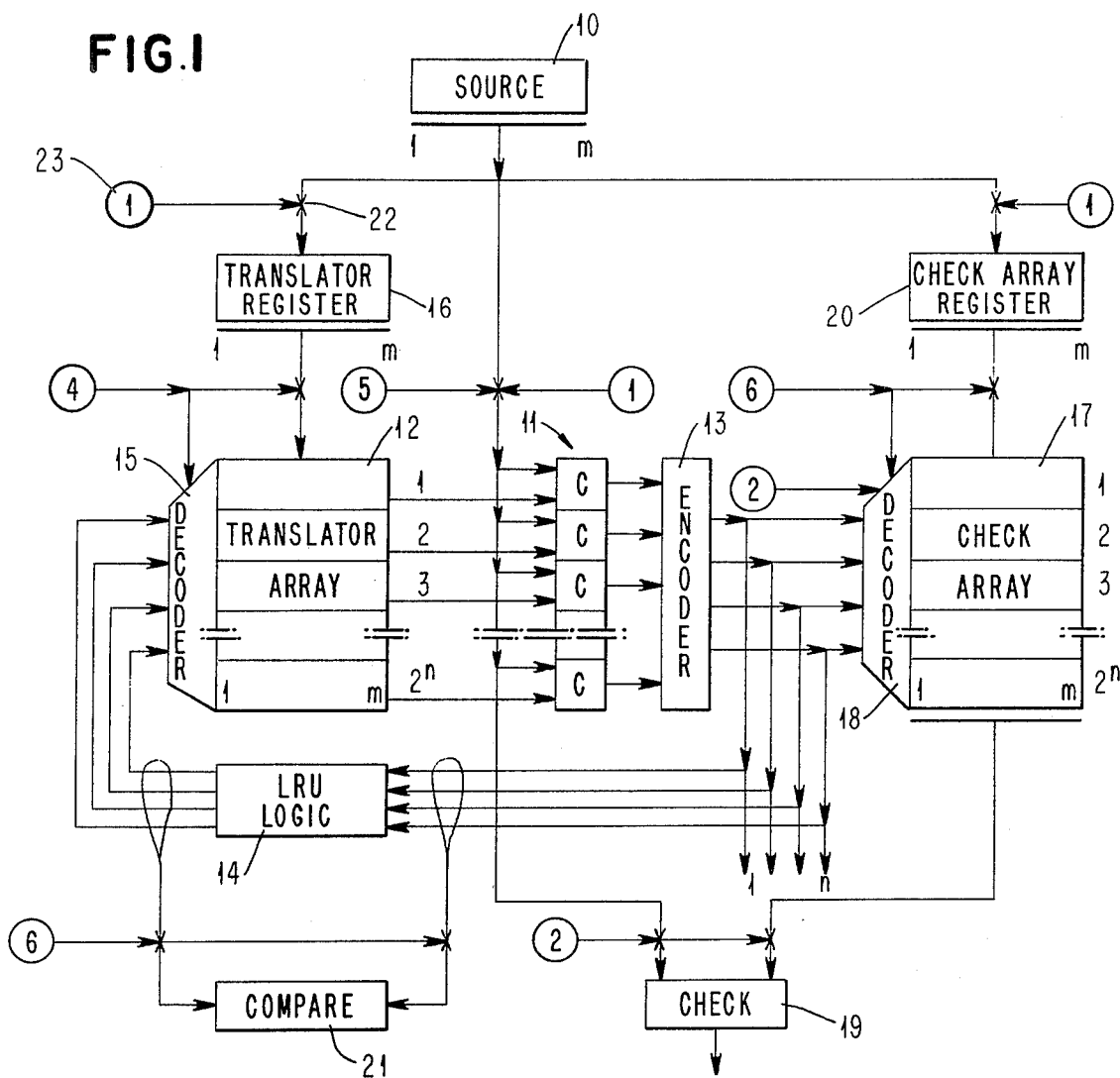
FIG. 1 is a block diagram showing the prior address translation mechanism and the added second, or check, array of registers for error detection.

In FIG. 1, there is shown some components which find counterparts, and therefore a more detailed explanation, in the above-referenced U.S. Pat. No. 3,248,702. These components include a Source 10 of a plurality ($m$) of binary bits of a first binary word for which a translation is to be accomplished. In the referred patent, the $m$ binary bits would be equal to 9. A number of comparators (C) are shown generally at 11, each being associated with an $m$ bit register of a Translator Array 12. When the $m$ bits of the Source 10 match the $m$ bits of a particular register in Translator Array 12, the associated comparator 11 will produce an output to an Encoder 13. Encoder 13 provides a second binary coded word comprised of $m$ bits, the permutations of which will identify the register of the Translator Array 12 indicating the match with the Source 10. In the above referred to patent, the $n$ binary bits would be equal to 4. These 4 binary bits will identify one of the $2^n$ registers of the Translator Array 12. In the above referred to patent, $2^n$ is equal to 16.

Also shown in FIG. 1, is LRU logic 14, a counterpart of which can be found in the above referred to U.S. Pat. No. 3,217,298. Although any replacement algorithm may be used, LRU refers to a least recently used replacement algorithm. As various registers of the Translator Array 12 indicate matches with the Source 10, the $m$ binary bits at the output of an Encoder 13 are applied to the LRU logic 14 to provide an indication of the sequence in which the matches occur. When it becomes necessary to replace the contents of one of the registers of the Translator Array 12, the LRU Logic 14 will identify the register least recently used. The output of the LRU Logic 14, comprised of 4 binary address bits, will be applied to an Address Decoder 15 associated with the Translator Array 12 to select the register for replacement. The data to be entered into the register selected by the Decoder 15 will be supplied by a Translator Register 16 which has previously received the contents of the Source 10.

The apparatus provided in addition to that previously referred to, includes a Check Array 17 and associated Address Decoder 18, Check Circuit 19, Check Array Register 20, and a Compare Circuit 21. The Check Array 17 is comprised of $2^n$ registers, each storing an $m$ bit binary word. The registers of the Check Array 17 can be stored into or read out from under control of the Address Decoder 18 which responds to the 4 binary bits provided by the Encoder 13.

Figure 2:
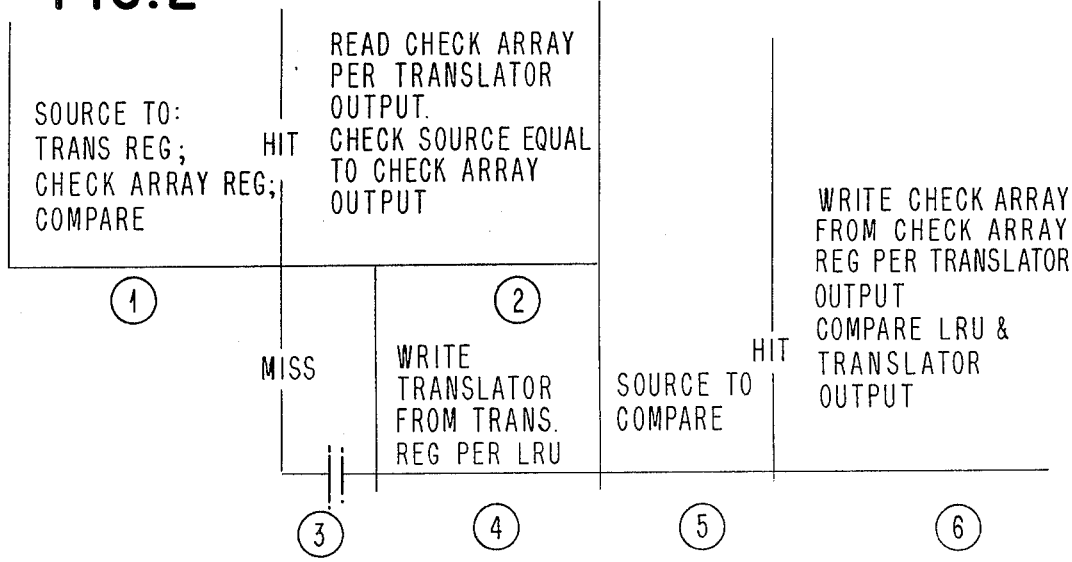
FIG. 2 is a representation of basic cycles of operation of the apparatus of FIG. 1.

The remainder of the discussion will refer both to FIG. 1 and FIG. 2. The symbol X shown at 22 represents a plurality of gates, each of which is associated with a particular binary bit. When the gates are energized by a timing pulse, they will transfer binary data from one location to another. The gates 22, and other apparatus shown in FIG. 1, will be energized at particular cycle times as indicated in FIG. 2. Timing pulses, or gate energizations are shown in FIG. 1, and are associated with identified cycle times of FIG. 2. One of these is noted at 23 in FIG. 1.

The remainder of the discussion will be keyed to the major cycle times of FIG. 2.

Cycle 1

The $m$ binary bits of the first binary word, which is to be translated, are gated and transferred to the Translator Register 16, Check Array Register 20, and applied to all the Comparators 11. The first binary word from Source 10 is thereby compared with the $m$ binary bits presently stored in the registers of the Translator Array 12. If one of the Comparators 11 indicates a match, this signifies a "hit", and the apparatus proceeds to Cycle 2.

Cycle 2

Encoder 13 will provide a binary code identifying the one Comparator 11 which has indicated a match, and therefore identifies the particular register of the Translator Array 12 which contains $m$ binary bits identical to the $m$ binary bits of Source 10. The $m$ binary bits from Encoder 13 comprising a second binary word, are applied to the address Decoder 18 of the Check Array 17. The $m$ binary bits of the addressed register of Check Array 17 and the $m$ binary bits of Source 10 are applied to the Check circuitry 19. The Check circuitry 19 will provide an output signifying a match, or mismatch between the contents of the addressed register of the Check Array 17 and the Source 10. A mismatch indication provided by the Check circuitry 19 will indicate erroneous information in the registers of the Translator Array 12, improper functioning of the Comparators 11, or improper functioning of the Encoder 13. The match or mismatch indication from Check circuitry 19 is then utilized by the system in which the invention is being utilized for initiating continued operation, or corrective procedures in response to error indications.

Cycle 3

At the the completion of Cycle 1, the fact that none of the registers of the Translator Array 12 contain $m$ binary bits identical to the $m$ binary bits of Source 10 will be signified by the absence of an output from any of the Comparators 11 and therefore signify a "miss." In accordance with the above referred to U.S. Pat. No. 3,217,298, one of the registers of the Translator Array 12 must be selected for entry of the $m$ binary bits from the Source 10 for use in subsequent translations. During Cycle 3, the LRU Logic 14 will be utilized and cycled for the purpose of providing an output to the address Decoder 15 of Translator Array 12 to select the register least recently used to receive the new $m$ binary bits from Source 10.

Cycle 4

The $m$ binary bits from Source 10 had previously been entered into the Translator Register 16. The output of the LRU Logic 14 applied to the address Decoder 15 is utilized to select the register of Translator Array 12 to receive the $m$ binary bits from Translator Register 16. Therefore, the new translation for the $n$ binary bits from Source 10 will have been determined by the LRU Logic 14.

Cycle 5

The contents of the Source 10 are again applied to the Comparators 11. The translation for the $m$ binary bits will now be indicated by a match from the Comparator 11 associated with the register of the Translator Array 12 selected by the LRU Logic 14. Therefore, a hit will be indicated.

Cycle 6

The $m$ binary bits which initially indicated a miss, and now indicate a hit, were previously stored into the Check Array Register 20. The 4 binary bits at the output of Encoder 13, representing the translation, are applied to the address Decoder 18 of Check Array 17 to select the register associated with the register of the Translator Array 12 which has now received the $m$ binary bits from Source 10. The $m$ binary bits from Source 10 will be stored into the addressed register of the Check Array 17. The proper performance of the circuitry in storing the new $m$ binary bits into both the Translator Array 12 and the Check Array 17 can be checked by the Compare Circuit 21. The LRU Logic 14, which identifies the register of the Translator Array 12 to have received the $m$ binary bits from Source 10, and therefore the translation, and the present output of the Encoder 13 should be equal. This check is made in the Compare Circuit 21 which utilizes the 4 binary bits of the Encoder 13 and the 4 binary bits at the output of the LRU Logic 14 for the purpose of indicating an equality and therefor proper entry of information into the registers of both arrays.

There has thus been shown error detection apparatus which checks the proper functioning of a translator. The relationship between the first and second binary code at the output of the translator is controlled by the physical location of the first code in the Translation Array 12. The relationship as reflected by the output of Encoder 13, is utilized to access checking apparatus in the form of Check Array 17. While there has been shown a Translator for use in mapping blocks of data in a storage hierarchy, the translator could just as well be utilized for a one to one translation. That is, $m$ binary bits could be translated to a new $m$ binary bit code. The translation into $m$ binary bits of a second code at any particular time will be dictated by the physical location of the $m$ binary bits of the first code in the Translator Array 12.

What is claimed is:

1. Error detection apparatus comprising:
a binary word source;
translator means, including input means connected to said binary coded word source for receiving a first plural-bit binary word, a plurality of registers for storing a corresponding plurality of said first words, and output means, including identifying means connected and responsive to said input means and said register means for producing a second plural-bit binary word which is related to said first work by identifying one of said plurality of register means storing one of said first words equal to a said first word received from said binary word source; and
check means, connected to said binary word source and the output of said translator, including check signalling means for indicating the proper identification of one of said plurality of registers.

2. Error detection apparatus in accordance with claim 1 wherein said identifying means includes:
a plurality of comparators, each connected to and associated with, a corresponding one of said register means, and all connected and responsive to said input means, each said comparator providing an equality signal when said first word received from said binary word source equals the binary word in said associated register; and
encoder means, connected to said comparators, for providing said second binary word identifying the one of said comparators providing said equality signal.

3. Error detection apparatus in accordance with claim 2 wherein said check means includes:
a plurality of check registers, each associated with and storing the same one of said first words as, one of said registers in said translator means;
access means, connected between said encoder and said check registers, for providing a read-out signal manifesting the contents of one of said check registers identified by said second binary word; and
said check signalling means includes, a further comparator, connected and responsive to said read-out signal and said binary word source, for providing said check signal.

4. Error detection apparatus in accordance with claim 3 wherein:
said first word is comprised of $m$ binary bits; and
said second word is comprised of $n$ binary bits, where n is less than m.

5. Error detection apparatus in accordance with claim 1 wherein:
said plurality of registers are an associative memory.

* * * * *